Sept. 10, 1929.    R. LIPPERT    1,727,510
HAM BOILER
Filed July 12, 1927    2 Sheets-Sheet 1
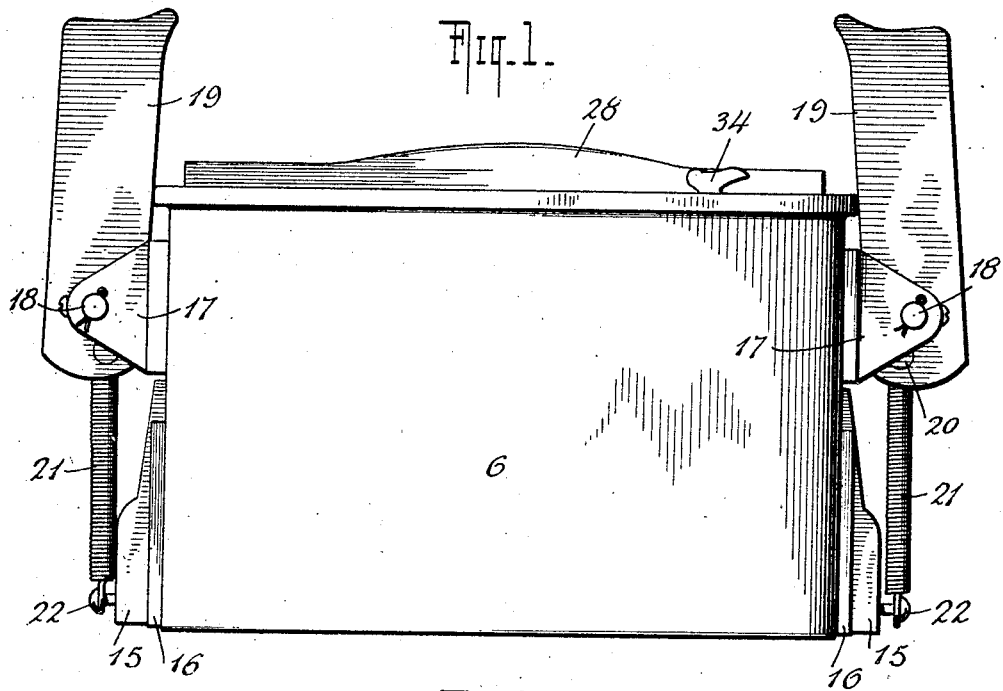
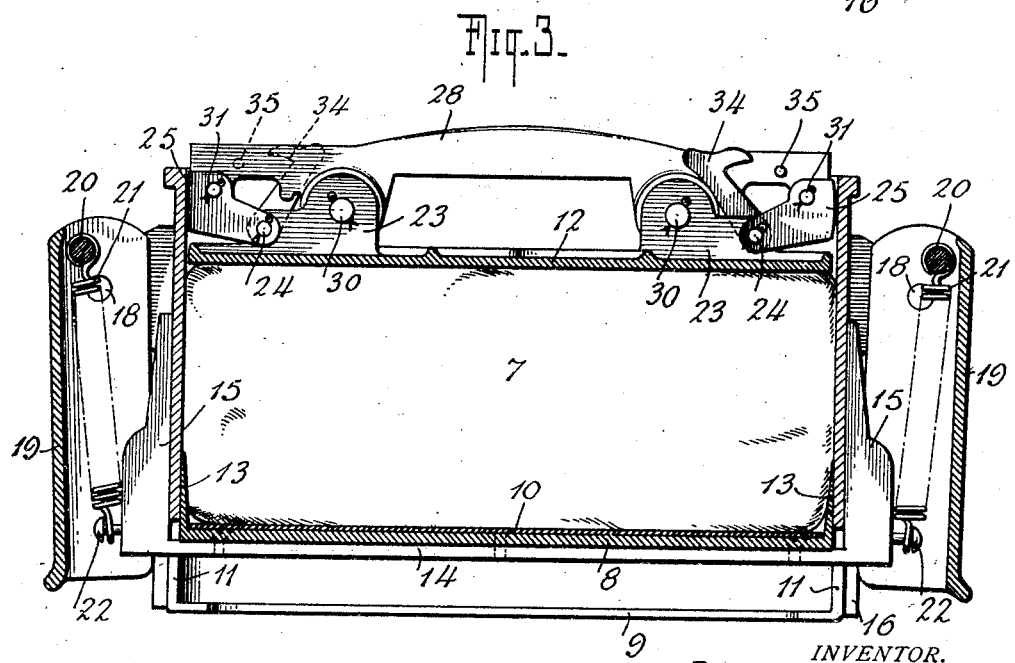
INVENTOR.
RICHARD LIPPERT
BY Richards & Geier
ATTORNEYS.

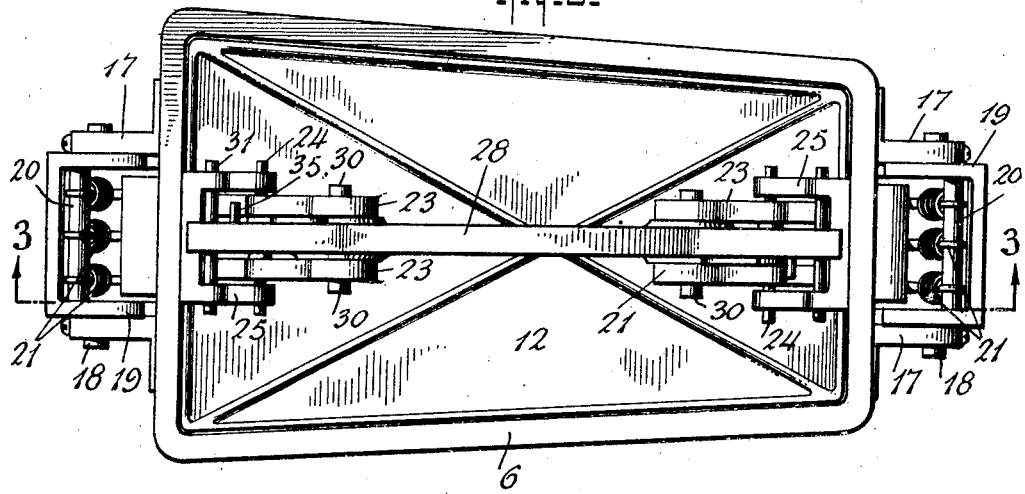
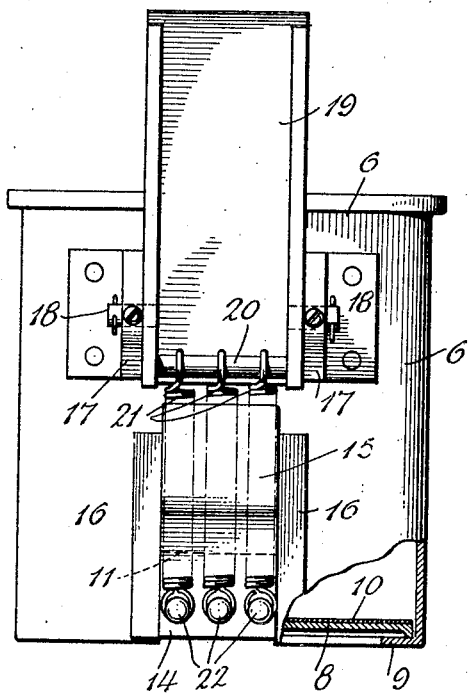
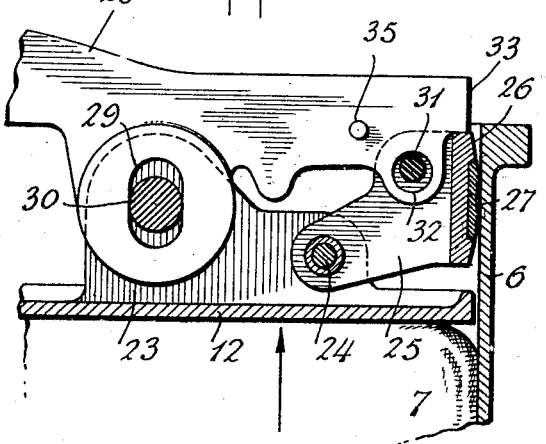

Patented Sept. 10, 1929.

1,727,510

UNITED STATES PATENT OFFICE.

RICHARD LIPPERT, OF NEW YORK, N. Y.

HAM BOILER.

Application filed July 12, 1927. Serial No. 205,067.

This invention relates to improvements in ham boilers such as used for cooking hams and the like.

My previous Patents No. 1,539,680 of May 26, 1925, No. 1,560,066 of November 3, 1925, and No. 1,584,461 of May 11, 1926, disclose boilers of a type similar to the present invention wherein the boiler casings are provided with movable bottoms capable of being moved upwardly to exert upward pressure against the contents of the casings, and wherein covers for the casings, against which said contents also engage, are locked to the casings by a pawl and ratchet means arranged exteriorly thereof.

In accordance with the present invention it is proposed to overcome certain difficulties encountered in the handling of boilers of the above type by providing a cover in which the locking means thereof is so disposed on the cover that said means will be arranged entirely within the confines of the walls of the casing and will positively engage the interior surfaces of said walls in such manner that the cover will be securely held in its locked position. To this end, the cover is provided with gripping elements engageable with walls of the casing and so connected to the cover that when an upward pressure is exerted against the latter the gripping elements are caused to bind against said walls and this binding action is proportionate to the amount of said pressure.

The invention further contemplates the provision of a movable bottom to which a uniform upward pressure may be applied, after a ham has been placed in the casing, which pressure will maintain the ham under constant compression during the boiling process. This upward pressure is accomplished by the manipulation of levers pivoted to the casing and connected to the bottom by resilient means which perform the dual function of exerting an upward pressure upon said bottom to compress the ham between it and the cover and retain the latter in its locked position, and to yieldably maintain said levers in operated positions.

The inventive idea involved is capable of receiving a variety of mechanical expressions, one of which, for purposes of illustration, is shown in the accompanying drawings; it is to be expressly understood, however, that said drawings are employed merely for the purpose of facilitating the description of the invention as a whole and not to define the limits thereof, reference being had to the appended claims for this purpose.

In the drawings—

Figure 1 is a side elevation of a boiler constructed in accordance with the invention and showing the operating means for the bottom in inoperative position;

Figure 2 is a top plan view of the boiler with the parts in operated position;

Figure 3 is a longitudinal section on the line 3—3 of Figure 2;

Figure 4 is an end elevation of Figure 1, partly broken away and shown in section; and Figure 5 is an enlarged fragmentary longitudinal section of one of the locking elements for the cover of the boiler.

The boiler is shown in its preferred form as comprising a trapezoidal casing 6 adapted to receive a ham 7 or other meat to be cooked and provided with an open top and a vertically movable bottom 8 which rests upon the inturned flange 9 of the casing when the bottom is in its lowermost position, as shown in Figure 4. A removable plate 10 is preferably placed upon the bottom 8 to form a contact surface for the ham 7 and space the same from the bottom, so as to protect the latter against any corrosion or other deteriorating effect which might otherwise occur if the ham were in direct contact with the bottom. The end walls of the casing 6 are provided adjacent the bottom and intermediate the side walls with the vertical openings 11 which are of sufficient height to permit of the maximum upward movement of the bottom 8 when compressing the ham 7 between said bottom and the removable cover 12 preparatory to the cooking operation. The ends of the bottom 8 are provided with upwardly extending plates 13 which form closures for the openings 11 in any position of the bottom 8 so that the juices which accumulate during the cooking operation will not escape from the casing. Secured to the underside of the bottom 8 is a supporting strap or cradle 14 having its ends projecting through the openings 11 and provided at its extremities with the end pieces 15 which extend upwardly from the strap exteriorly of the end walls of the casing and which are slidable between guides 16 vertically arranged on opposite sides of the openings 11.

Opposed bearings 17 are secured to each end wall of the casing above the opening 11 therein and mounted for pivotal movement between these bearings, by means of pins 18, is a lever 19 of channel formation. Between the axis of rotation of the lever and the adjacent end thereof there is provided a rod 20 to which is connected adjacent ends of three coil springs 21, the other ends of which are engaged with a plurality of pins 22 extending from the adjacent end piece 15. When the lever 19 is in its raised position and the bottom 8 is resting upon the supporting flange 9 of the casing, as shown in Figure 1, the rod 20 to which the springs are connected is below the pivot 18 of the lever and the springs are contracted. When, however, the levers are simultaneously swung downwardly and outwardly about their pivots 18 toward the positions shown in Figure 3, an upward pull is exerted upon the springs thus drawing the bottom 8 upwardly in the casing to thereby compress the ham 7 between the bottom 8 and the cover 12, the latter having been previously inserted into the top of the casing and in engagement with the ham and locked in such position in a manner hereinafter to be described. As the downward movement of the levers progresses and the consequent upward pressure upon the ham increases, the springs 21 are expanded until the rods 20, which are moving in an arc about the pivots 18, have passed outwardly beyond dead center or the vertical plane through said pivots 18. The springs now being under compression will exert a constant upward pull upon the bottom 8 and will also yieldably maintain the levers 19 in their adjusted or operated positions wherein the channel formation of said levers will enclose the springs. By thus maintaining the ham 7 under constant pressure during the cooking process to which it is subjected after the adjustment of the bottom and cover, very good results are obtained in the final product and the fatty part of the ham, which is usually placed upon the plate 10 when positioning the ham within the casing, is evenly distributed throughout the outer surface of the ham when the cooking process has been completed.

The means for locking the cover 12 in position within the casing and in contact with the ham 7 will now be described. Adjacent each end of the cover and extending upwardly therefrom is a pair of lugs 23 and pivotally connected to these lugs, by means of a pin 24, is a gripping element 25 having an outer curved surface 26 in which is seated a plate 27, the outer surface of which is also curved and serrated to provide a roughened gripping surface adapted to frictionally engage the inner surface of the adjacent end wall of the casing 6 when the cover is in locked position. The gripping element 25 is of such proportion, that is the distance between the the axis of rotation about the pin 24 and the surface of the plate 27 is such, that said surface will project slightly beyond the adjacent end of the cover when the gripping element is moved downwardly toward the cover.

A handle bar 28 has a vertical sliding connection with the two pair of lugs 23 by means of the slot 29 formed in the handle bar adjacent each end thereof and through which projects the pin 30 connecting the lugs of each pair. The handle bar also has a loose connection with each of the elements 25 through the medium of a pin 31 carried by each element and extending through an opening 32 in the handle bar adjacent the extremity thereof. Each extremity 33 of the handle bar overhangs the upper edge of the adjacent element 25 and is adapted to contact said edge when downward pressure is applied to the handle bar. In placing the cover 12 in position within the casing the intermediate portion of the handle 28 between the pairs of lugs 23 is grasped and when lifting the cover preparatory to inserting it into the casing said handle will move upwardly relative to the cover by reason of the slots 29 and the openings 32. This movement is sufficient to permit the portions of the handle forming the lower parts of the openings 32 to contact the pins 31 and thereby swing the elements 32 upwardly about their pivots 24 to bring the gripping surfaces 27 of said elements in substantially vertical alignment with the ends of the cover. Thereupon the cover may be inserted into the top of the casing and engaged with the top of the ham therein. Downward pressure is now exerted upon the handle 28 which initially results in a downward movement of said handle relative to the cover until the overhanging ends 33 contact the upper edges of the elements 25. Continued pressure upon the handle now forces the elements 25 downwardly, by reason of said contact, and in planes perpendicular to the cover and in arcs tangential to the end walls. The gripping plates 27 thereby move outwardly into gripping contact with the inner surfaces of the adjacent end walls.

After the cover has been so adjusted the levers 19, which are raised during this operation, are swung downwardly, as previously described, to force the bottom 8 upwardly and thereby compress the ham between the same and the cover. This upward pressure against the ham is, of course, transmitted to the cover 12 and results in a slight relative movement of the cover with respect to the handle by reason of the slotted connection 29, 30. This relative movement of the cover is also imparted to the pivots 24, resulting in a slight rocking movement of the elements 25 about their gripping surfaces 27, as a consequence of which the gripping action of said surfaces will be increased to more firmly lock the cover in position within the casing.

As a safety means for preventing any possibility of movement of the handle relative to the cover after the latter has been locked in position, which relative movement may result in the release of the gripping elements, or at least a decrease in the gripping effect thereof, latches 34 are pivoted to the pins 24 and swung into engagement with pins 35 carried by the handle, thus locking the latter against any movement with respect to the cover. However, it has been found in actual practice that the gripping action of the elements 25 is such that the latches 34 may be entirely dispensed with, if desired.

Following the usual cooking operation in which the boiler is immersed in water, the ham may be withdrawn from the casing by first swinging the levers 19 to their raised or inoperative positions, thus lowering the bottom 8 and relieving pressure upon the ham which has heretofore been applied thereto by the springs 21. Thereupon the latches 34, if they are employed, are released from the pins 35 and the handle is then lifted. As this is done there is initially a slight relative movement of the handle with respect to the cover until the lower walls of the openings 32 contact the pins 31 and continued lifting of the handle then swings the gripping elements 25 upwardly and out of gripping engagement with the end walls of the casing, whereupon the cover may be withdrawn from the casing and the ham extracted therefrom.

What is claimed is:

1. In a meat boiler, a casing, a removable cover movable into said casing and engageable with the contents thereof to exert a pressure thereon, and means carried by said cover and having gripping surfaces movable in planes tangential to the adjacent surfaces of certain walls of the casing to bring the surfaces of said means into binding engagement with those of said walls to lock said cover in compressing engagement with said contents.

2. In a meat boiler, a casing, a cover therefor movable into the casing to engage the contents thereof, and gripping elements each pivoted to said cover for movement in a plane perpendicular thereto and into binding engagement with the inner surfaces of opposed walls of the casing to retain the cover against outward movement relative to the casing by reason of pressure of said contents thereagainst, and means to exert a pressure upon said gripping elements to move the same about their pivots and thereby effect said binding engagement.

3. In a meat boiler, a casing, a cover therefor movable into the casing to engage the contents thereof, and gripping elements each pivoted to said cover for movement in a plane perpendicular thereto and into binding engagement with the inner surfaces of opposed walls of the casing to retain the cover against outward movement relative to the casing by reason of pressure of said contents thereagainst, said binding engagement varying proportionately to the amount of pressure upon the cover by said contents.

4. In a meat boiler, a casing, a removable cover therein engageable with the contents of the casing, gripping elements carried by the cover and contacting the inner surfaces of walls of the casing to effect a binding action thereagainst, and a handle for the cover connected to said gripping elements and movable relative to the cover to engage said gripping elements with said walls when inward pressure is exerted upon said handle.

5. In a meat boiler, a casing, a removable cover therein engageable with the contents of the casing, gripping elements carried by the cover and contacting the inner surfaces of walls of the casing to effect a binding action thereagainst, a handle for the cover connected to said gripping elements and movable relative to the cover to engage said gripping elements with said walls when inward pressure is exerted upon said handle, and means carried by said cover and engageable with said handle to lock the same against outward movement relative to the cover after said gripping elements are in binding engagement with said walls.

6. In a meat boiler, a casing, a cover therefor movable into the casing to engage the contents thereof, gripping elements carried by said cover and operated by upward pressure against the cover to bind against certain walls of said casing, and means for applying said upward pressure.

7. In a meat boiler, a casing, a cover therefor movable into the casing to engage the contents thereof, gripping elements carried by said cover and operated by upward pressure against the cover to bind against certain walls of said casing, the binding action of said gripping elements increasing as the pressure against said cover is increased, and means for applying pressure to the cover.

8. In a meat boiler, a casing, a removable cover therein adapted to engage the contents of the casing, gripping elements pivoted to the cover and movable into binding contact with the inner surfaces of walls of the casing, and a handle for the cover having movement relative thereto and to said gripping elements, said handle being engageable with said gripping elements when downward pressure is exerted on the handle to force said elements into binding contact with said walls.

9. In a meat boiler, a casing, a removable cover therein adapted to engage the contents of the casing, gripping elements pivoted to the cover and movable into binding contact with the inner surfaces of walls of the casing, a handle for the cover having movement relative thereto and to said gripping elements, said handle being engageable with said gripping elements when downward pressure is exerted on the handle to force said elements into binding contact with said walls, and latches carried by the cover and engageable with said handle to prevent said relative movement after said binding contact has been effected.

10. In a meat boiler, a casing, a removable cover therein adapted to engage the contents of the casing, lugs on said cover, gripping elements pivoted to said lugs and movable relative to the cover to positions wherein portions of said gripping elements project outwardly beyond adjacent edges of the cover so as to engage surfaces of walls of said casing, and a handle connected to said lugs for relative movement with respect to the cover, said handle having portions contacting said gripping elements to move the same about their pivots and into binding engagement with said walls of the casing.

11. In a meat boiler, a casing, a removable cover therein adapted to engage the contents of the casing, lugs on said cover, gripping elements pivoted to said lugs and movable relative to the cover to positions wherein portions of said gripping elements project outwardly beyond adjacent edges of the cover so as to engage surfaces of walls of said casing, a handle connected to said lugs for relative movement with respect to the cover, said handle having portions contacting said gripping elements to move the same about their pivots and into binding engagement with said walls of the casing, and latches pivotally connected to said lugs and engageable with said handle to prevent movement thereof relative to said cover.

12. In a meat boiler, a casing, a removable cover movable into said casing and engageable with the contents thereof to exert a pressure thereon, means having gripping engagement with the interior surfaces of walls of the casing for securing the cover against outward movement relative thereto, a bottom for the casing movable therein, levers pivoted to said casing, and resilient elements connecting said levers with said bottom and placed under tension by the movement of said levers in one direction to draw said bottom upwardly in said casing and exert a constant pressure thereon.

13. In a meat boiler, a casing, a removable cover movable into said casing and engageable with the contents thereof to exert a pressure thereon, means having gripping engagement with the interior surfaces of walls of the casing for securing the cover against outward movement relative thereto, a bottom for the casing movable therein, levers pivoted to said casing, and resilient elements connecting said levers with said bottom and placed under tension by the movement of said levers in one direction to draw said bottom upwardly in said casing and exert a constant pressure thereon, the connection of said resilient elements with said levers being such as to yieldably retain the latter in the positions assumed thereby when said resilient elements are under tension.

14. In a meat boiler, a casing, a removable cover movable into said casing and engageable with the contents thereof to exert a pressure thereon, means to lock said cover to said casing, a bottom for the casing movable therein, levers pivoted to the casing, and springs connecting said levers with said bottom and tensioned by the operation of said levers to exert an upward pull and pressure upon said bottom.

15. In a meat boiler, a casing, a removable cover movable into said casing and engageable with the contents thereof to exert a pressure thereon, means to lock said cover to said casing, a bottom for the casing movable therein, levers pivoted to the casing, and springs connecting said levers with said bottom and tensioned by the operation of said levers to exert an upward pull and pressure upon said bottom, said levers being of channel formation and enclosing said springs when the levers are operated.

16. In a meat boiler, a casing, a cover therefor movable into the casing to engage the contents thereof, and means movable relative to said cover to effect a binding engagement with adjacent walls of said casing, said means being further movable relative to the cover by pressure of said contents against the latter to increase said binding engagement, and means to produce the additional movement of said movable means.

17. In a meat boiler, a casing, a cover therefor movable into the casing to engage the contents thereof, gripping elements having pivotal movement relative to said cover to effect a binding engagement with adjacent walls of said casing and being further movable relative to the cover by pressure of said contents against the latter to increase said binding engagement, and means to produce the further movement of said gripping elements.

18. In a meat boiler, a casing, a removable cover movable into said casing and engageable with the contents thereof to exert a pressure thereon, means having gripping engagement with the interior surfaces of walls of the casing for securing the cover against outward movement relative thereto, a bottom for the casing movable therein, springs attached to said bottom, and means connected to said springs and operable to place the same under tension to thereby exert an upward pull upon said bottom to increase the effect of said gripping means.

19. In a meat boiler, a casing, a cover therefor, a bottom for the casing movable therein, levers pivoted to said casing, and springs connecting said bottom with said levers at points adjacent the pivots of the latter and expanded by a movement of the levers in one direction to draw said bottom into the casing and toward said cover to exert a constant pressure upon the contents of the casing between said cover and bottom.

In testimony whereof I have affixed my signature.

RICHARD LIPPERT.